(12) United States Patent
Li

(10) Patent No.: US 12,166,444 B2
(45) Date of Patent: *Dec. 10, 2024

(54) MULTI-PHASE PERMANENT MAGNET ROTOR MOTOR WITH INDEPENDENT PHASE COIL WINDINGS

(71) Applicant: KINETIC TECHNOLOGIES INTERNATIONAL HOLDINGS LP, Toronto (CA)

(72) Inventor: Kwei Chung Li, Kowloon (HK)

(73) Assignee: Kinetic Technologies International Holdings LP, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/226,085

(22) Filed: Jul. 25, 2023

(65) Prior Publication Data

US 2023/0378898 A1    Nov. 23, 2023

Related U.S. Application Data

(63) Continuation of application No. 17/462,773, filed on Aug. 31, 2021, now Pat. No. 11,799,411.

(51) Int. Cl.
*H02P 21/00* (2016.01)
*H02P 21/18* (2016.01)
(Continued)

(52) U.S. Cl.
CPC .............. *H02P 27/12* (2013.01); *H02P 21/18* (2016.02); *H02P 21/22* (2016.02); *H02P 2207/055* (2013.01)

(58) Field of Classification Search
CPC ........... H02P 27/12; H02P 21/18; H02P 21/22
(Continued)

(56) References Cited

U.S. PATENT DOCUMENTS

2009/0134828 A1    5/2009 Chakrabarti et al.
2012/0032622 A1    2/2012 Lipo
(Continued)

FOREIGN PATENT DOCUMENTS

CN    104270062 A    1/2015
CN    106936361 A    7/2017
(Continued)

OTHER PUBLICATIONS

PCT International Search Report and the Written Opinion mailed Oct. 19, 2022, issued in related International Application No. PCT/CN2022/106533 (9 pages).
(Continued)

*Primary Examiner* — Erick D Glass
(74) *Attorney, Agent, or Firm* — Sheppard Mullin Richter & Hampton LLP

(57) ABSTRACT

A multi-phase permanent magnet rotor motor comprises a plurality of phase coil windings with each phase coil winding having two free ends and the plurality of phase coil windings being without a common node. A controller is provided comprising a plurality of full-bridge inverters. Each full-bridge inverter has two output ends electrically connected to the two free ends of a corresponding phase coil winding. The controller is configured to operate the plurality of full-bridge inverters to output pulse modulated control signals to their respective phase coil windings. The outputted pulse modulated control signals can comprise a combination of sine wave signals and full-bridge space vector modulation signals.

19 Claims, 13 Drawing Sheets

(51) Int. Cl.
*H02P 21/22* (2016.01)
*H02P 27/12* (2006.01)

(58) Field of Classification Search
USPC .................................................. 318/400.02
See application file for complete search history.

(56) References Cited

U.S. PATENT DOCUMENTS

| | | | |
|---|---|---|---|
| 2013/0314009 A1 | 11/2013 | Sanchez et al. | |
| 2014/0210387 A1 | 7/2014 | Zhao et al. | |
| 2015/0077030 A1 | 3/2015 | Soh et al. | |
| 2015/0211533 A1 | 7/2015 | Nagata | |
| 2016/0141990 A1 | 5/2016 | Hoffmann et al. | |
| 2017/0373618 A1 | 12/2017 | Miyazawa et al. | |
| 2020/0059189 A1 | 2/2020 | Ohashi | |
| 2021/0257947 A1 | 8/2021 | Kinjo et al. | |
| 2021/0281207 A1* | 9/2021 | Mueller | H02P 27/08 |
| 2023/0063318 A1* | 3/2023 | Lee | H02M 1/0054 |
| 2024/0072700 A1* | 2/2024 | Horvát | H02M 1/38 |

FOREIGN PATENT DOCUMENTS

| | | |
|---|---|---|
| CN | 107070347 A | 8/2017 |
| CN | 207010470 U | 2/2018 |
| CN | 109889006 A | 6/2019 |
| CN | 110999035 A | 4/2020 |
| CN | 111316561 A | 6/2020 |
| CN | 113315436 A | 8/2021 |
| JP | 2015-142389 A | 8/2015 |
| TW | I528685 B | 4/2016 |

OTHER PUBLICATIONS

First Search dated Mar. 24, 2023, issued in related Taiwan Application No. 111130665 (3 pages).
Jorge Zambada, "Sensorless Field Oriented Control of PMSM Motors", AN1078, Microchip Technology Inc., 2007.
"Sensorless PMSM Field-Oriented Control", DRM148, Freescale Semiconductor, Inc., 2016.
Wei Xu et al., "Improved Rotor Flux Observer for Sensorless Control of PMSM with Adaptive Harmonic Elimination and Phase Compensation", CES Transactions, vol. 3, Jun. 2019.
Non-Final Office Action dated Feb. 3, 2023, issued in related U.S. Appl. No. 17/462,773 (8 pages).
Notice of Allowance mailed Jul. 12, 2023, issued in related U.S. Appl. No. 17/462,773 (9 pages).

* cited by examiner

PRIOR ART

MULTI-PHASE PERMANENT MAGNET ROTOR MOTOR WITH INDEPENDENT PHASE COIL WINDINGS

CROSS REFERENCE TO RELATED APPLICATION

The present application is a continuation application of U.S. patent application Ser. No. 17/462,773, filed Aug. 31, 2021, entitled "Multi-Phase Permanent Magnet Rotor Motor With Independent Phase Coil Windings," the disclosure of which is incorporated by reference herein in its entirety.

FIELD OF THE INVENTION

The invention relates to a multi-phase permanent magnet rotor motor with independent phase coil windings and to a closed loop method of operating such a motor. The invention relates particularly, but not inclusively to a permanent magnet synchronous motor (PMSM) with independent phase coil windings having a sensorless closed-loop control system for synchronous operation

BACKGROUND OF THE INVENTION

The most common types of multi-phase, e.g., three-phase, motors are synchronous motors and induction motors. When three-phase electric conductors are placed in certain geometrical positions, which means at a certain angle from one another, an electrical field is generated. The rotating magnetic field rotates at a certain speed known as the synchronous speed. If a permanent magnet or electromagnet is present in this rotating magnetic field, the magnet is magnetically locked with the rotating magnetic field and consequently rotates at the same speed as the rotating field which results in a synchronous motor, as the speed of the rotor of the motor is the same as the speed of the rotating magnetic field.

A permanent magnet motor uses permanent magnets in the rotor to provide a constant magnetic flux which has a sinusoidal back-electromotive force (emf) signal. The rotor locks in when the speed of the rotating magnetic field in the stator is at or near synchronous speed. The stator carries windings which are connected to a controller having a power stage including a voltage supply, typically an alternating current (AC) voltage supply, to produce the rotating magnetic field. Such an arrangement constitutes a PMSM.

PMSMs are similar to brushless direct current (BLDC) motors. BLDC motors can be considered as synchronous DC motors which use a controller having a power stage including a DC voltage supply, suitably converted, to produce the stator rotating magnetic field. BLDC motors therefore use the same or similar control algorithms as AC synchronous motors, especially PMSM motors.

Previously, it has been common in synchronous motor control systems to use at least one sensor, such as a Hall sensor, to detect the rotational position of the rotor during synchronous operation. However, sensorless motor control systems are now preferred.

Such sensorless motor control systems typically include a rotor position and speed estimation module where, during synchronous operation, rotor position and speed can be continuously estimated based on the back-emf induced by the rotating rotor. The estimated rotor positions and speeds are utilized to update and/or compensate the motor control signals during synchronous operation thereby providing sensorless closed-loop synchronous operation motor control.

Problems arise with known multi-phase permanent magnet rotor motors in maintaining accurate control of the rotor position through the estimated rotor positions and of efficiently achieving maximum constant torque.

Among other things, what is therefore desired is an improved method of estimating rotor positions and/or an improved method of operating a multi-phase permanent magnet rotor motor.

OBJECTS OF THE INVENTION

An object of the invention is to mitigate or obviate to some degree one or more problems associated with known methods of estimating rotor positions when operating a multi-phase permanent magnet rotor motor.

The above object is met by the combination of features of the main claims; the sub-claims disclose further advantageous embodiments of the invention.

Another object of the invention is to provide an improved method of operating a multi-phase permanent magnet rotor motor.

One skilled in the art will derive from the following description other objects of the invention. Therefore, the foregoing statements of object are not exhaustive and serve merely to illustrate some of the many objects of the present invention.

SUMMARY OF THE INVENTION

The invention relates to a multi-phase permanent magnet rotor motor comprising a plurality of phase coil windings with each phase coil winding having two free ends and the plurality of phase coil windings being without a common node. A controller is provided comprising a plurality of full-bridge inverters. Each full-bridge inverter has two output ends electrically connected to the two free ends of a corresponding phase coil winding. The controller is configured to operate the plurality of full-bridge inverters to output pulse modulated control signals to their respective phase coil windings. The outputted pulse modulated control signals can comprise a combination of sine wave signals and full-bridge space vector modulation signals.

In a first main aspect, the invention provides a multi-phase permanent magnet rotor motor comprising: a plurality of phase coil windings, each phase coil winding having two free ends, the plurality of phase coil windings being without a common node; and a controller comprising a plurality of full-bridge inverters, wherein each full-bridge inverter has two output ends electrically connected to the two free ends of a corresponding phase coil winding, the controller being configured to operate the plurality of full-bridge inverters to output pulse modulated control signals to their respective phase coil windings; wherein the controller is configured to output pulse modulated control signals to the respective phase coil windings as sine waves in a first range from zero of the magnitude of the controller bus voltage to a predetermined, selected, or calculated end value for said first range, and to output pulse modulated control signals to the respective phase coil windings as full-bridge space vector modulation (Fbsvm) signals in a second range commencing at the predetermined, selected, or calculated end value for said first range and ending at a predetermined, selected, or calculated end value for said second range, said end value for said second range comprising a radius of a biggest internal circle inside a corresponding space vector diagram.

In a second main aspect, the invention provides a three-phase permanent magnet rotor motor comprising: three phase coil windings, each phase coil winding having two free ends, the three phase coil windings being without a common node; and a controller comprising a three full-bridge inverters, wherein each full-bridge inverter has two output ends electrically connected to the two free ends of a corresponding phase coil winding, the controller being configured to operate the three full-bridge inverters to output pulse modulated control signals to their respective phase coil windings; wherein the controller is configured to output pulse modulated control signals to the respective phase coil windings as sine waves in a first range from zero of the magnitude of the controller bus voltage to 1.5 times the magnitude of the controller bus voltage, and to output pulse modulated control signals to the respective phase coil windings as full-bridge space vector modulation (Fbsvm) signals in a second range commencing at 1.5 times the magnitude of the controller bus voltage and ending at 1.73 times the magnitude of the controller bus voltage.

In a third main aspect, the invention provides a multi-phase permanent magnet rotor motor comprising: a plurality of phase coil windings, each phase coil winding having two free ends, the plurality of phase coil windings being without a common node; and a controller comprising a plurality of full-bridge inverters, wherein each full-bridge inverter has two output ends electrically connected to the two free ends of a corresponding phase coil winding, the controller being configured to operate the plurality of full-bridge inverters to output full-bridge space vector modulation (Fbsvm) signals to their respective phase coil windings; wherein each full-bridge inverter has a current sense circuit connected to only one half of each said full-bridge inverter.

In a fourth main aspect, the invention provides a closed loop method of driving the multi-phase permanent magnet rotor motor of any one of the first to third main aspects, the method comprising the steps of: receiving at the controller a sensed current signal from at least one of the side-halves of said full-bridge inverters; and modifying the estimated rotor position based on said received sensed current signal.

In a fifth main aspect, the invention provides a closed loop method of driving the multi-phase permanent magnet rotor motor of the first main aspect, the method comprising the steps of: outputting pulse modulated control signals to the respective phase coil windings as sine waves in a first range from zero of the magnitude of the controller bus voltage to a predetermined, selected, or calculated end value for said first range, and outputting pulse modulated control signals to the respective phase coil windings as full-bridge space vector modulation (Fbsvm) signals in a second range commencing at the predetermined, selected, or calculated end value for said first range and ending at a predetermined, selected, or calculated end value for said second range, said end value for said second range comprising a radius of a biggest internal circle inside a corresponding space vector diagram.

In a sixth main aspect, the invention provides a closed loop method of driving the three-phase permanent magnet rotor motor of the second main aspect, the method comprising the steps of: outputting pulse modulated control signals to the respective phase coil windings as sine waves in a first range from zero of the magnitude of the controller bus voltage to 1.5 times the magnitude of the controller bus voltage, and outputting pulse modulated control signals to the respective phase coil windings as full-bridge space vector modulation (Fbsvm) signals in a second range commencing at 1.5 times the magnitude of the controller bus voltage and ending at 1.73 times the magnitude of the controller bus voltage.

The summary of the invention does not necessarily disclose all the features essential for defining the invention; the invention may reside in a sub-combination of the disclosed features.

The forgoing has outlined fairly broadly the features of the present invention in order that the detailed description of the invention which follows may be better understood. Additional features and advantages of the invention will be described hereinafter which form the subject of the claims of the invention. It will be appreciated by those skilled in the art that the conception and specific embodiment disclosed may be readily utilized as a basis for modifying or designing other structures for carrying out the same purposes of the invention.

BRIEF DESCRIPTION OF THE DRAWINGS

The foregoing and further features of the present invention will be apparent from the following description of preferred embodiments which are provided by way of example only in connection with the accompanying figures, of which.

DESCRIPTION OF PREFERRED EMBODIMENTS

Figure 1:
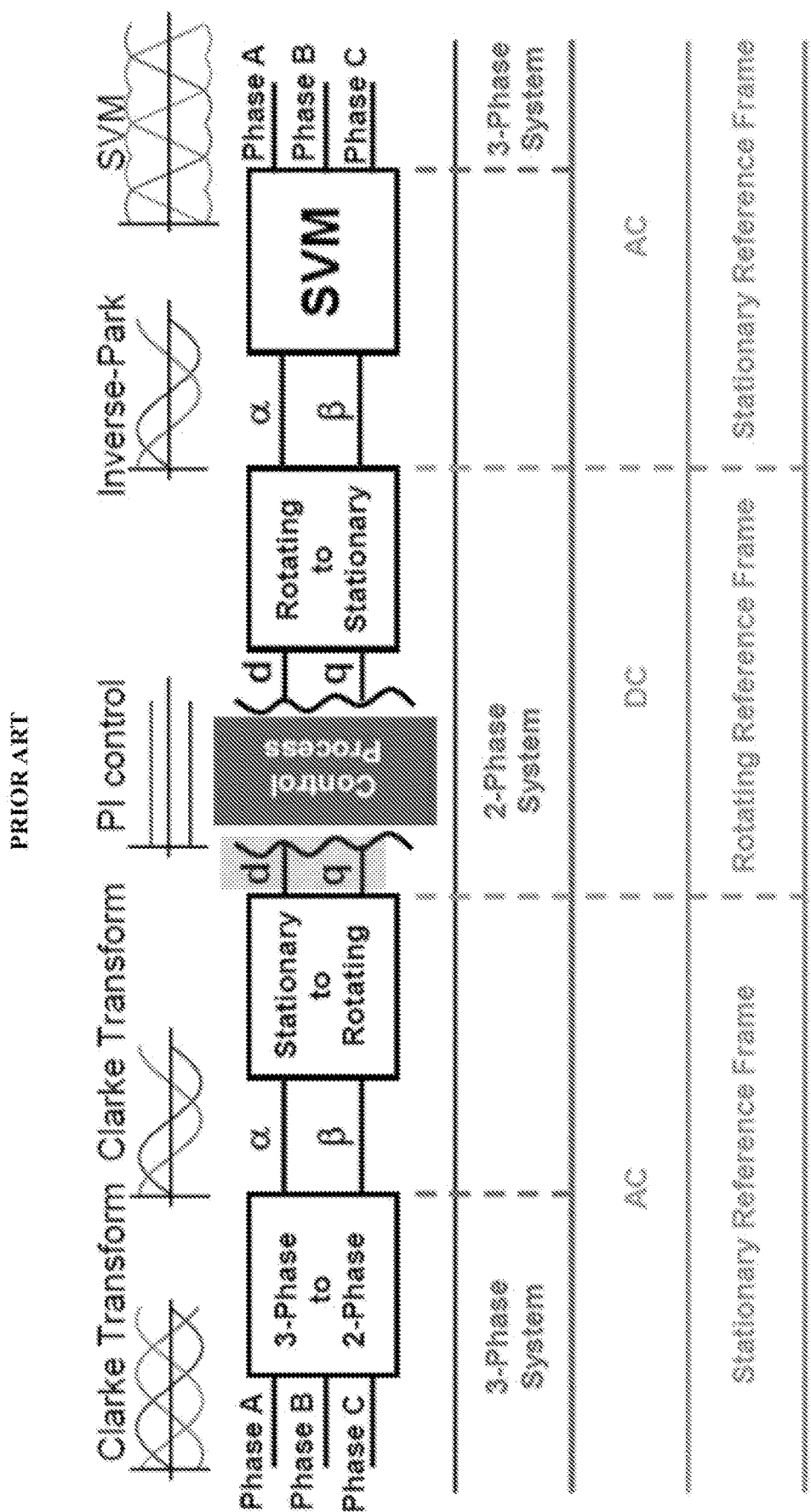
FIG. 1 is a block schematic diagram of a known sensor-less field-oriented control (FOC) system to drive connected phase coil windings of a three-phase, three-wire permanent magnet rotor motor.

The following description is of preferred embodiments by way of example only and without limitation to the combination of features necessary for carrying the invention into effect.

Reference in this specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

It should be understood that the elements shown in the FIGS. may be implemented in various forms of hardware, software, or combinations thereof. These elements may be implemented in a combination of hardware and software on one or more appropriately programmed general-purpose devices, which may include a processor, a memory and input/output interfaces.

The present description illustrates the principles of the present invention. It will thus be appreciated that those skilled in the art will be able to devise various arrangements that, although not explicitly described or shown herein, embody the principles of the invention and are included within its spirit and scope.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of systems and devices embodying the principles of the invention.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

In the claims hereof, any element expressed as a means for performing a specified function is intended to encompass any way of performing that function including, for example, a) a combination of circuit elements that performs that function or b) software in any form, including, therefore, firmware, microcode, or the like, combined with appropriate circuitry for executing that software to perform the function. The invention as defined by such claims resides in the fact that the functionalities provided by the various recited means are combined and brought together in the manner which the claims call for. It is thus regarded that any means that can provide those functionalities are equivalent to those shown herein.

Referring to the drawings, FIG. 1 comprises a schematic block diagram taken from the publication entitled "Sensorless PMSM Field-Oriented Control", the content of which is incorporated herein by reference. FIG. 1 illustrates a known sensorless field-oriented control (FOC) system to drive the connected phase coil windings of a three-phase, three-wire permanent magnet rotor motor.

Figure 2:
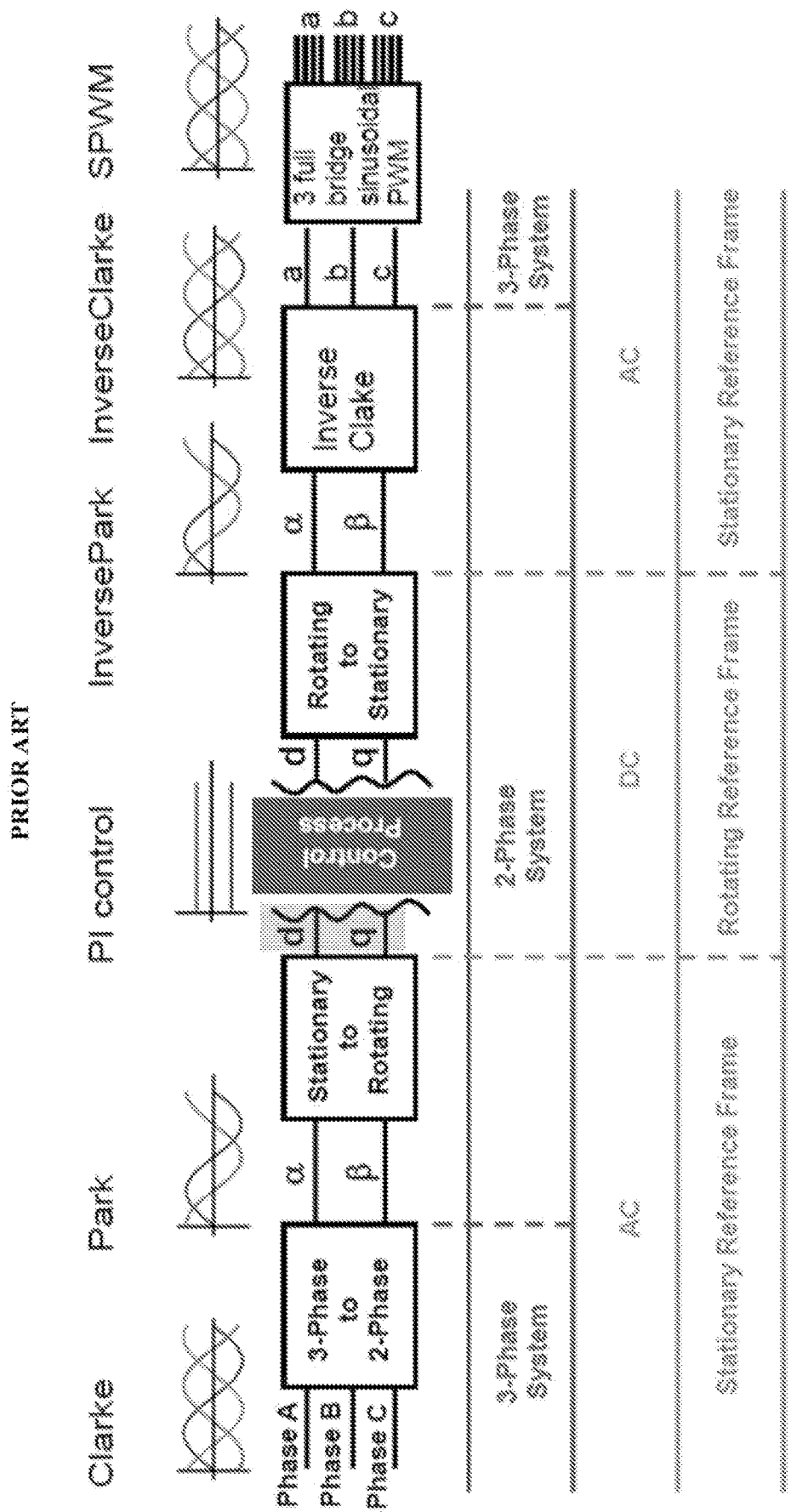
FIG. 2 is a block schematic diagram of a known sensor-less FOC system to drive separated phase coil windings of a three-phase, six-wire permanent magnet rotor motor.

By way of contrast, FIG. 2, taken from of the same publication, comprises a schematic block diagram illustrating the known concept of sensorless FOC of multi-phase separated windings with full-bridge inverters to drive the separated phase coil windings of the permanent magnet rotor motor. In FIG. 2, the motor comprises three phases but with three separated, i.e., independent, phase coil windings and three full-bridge inverters to drive the separated windings.

Figure 3:
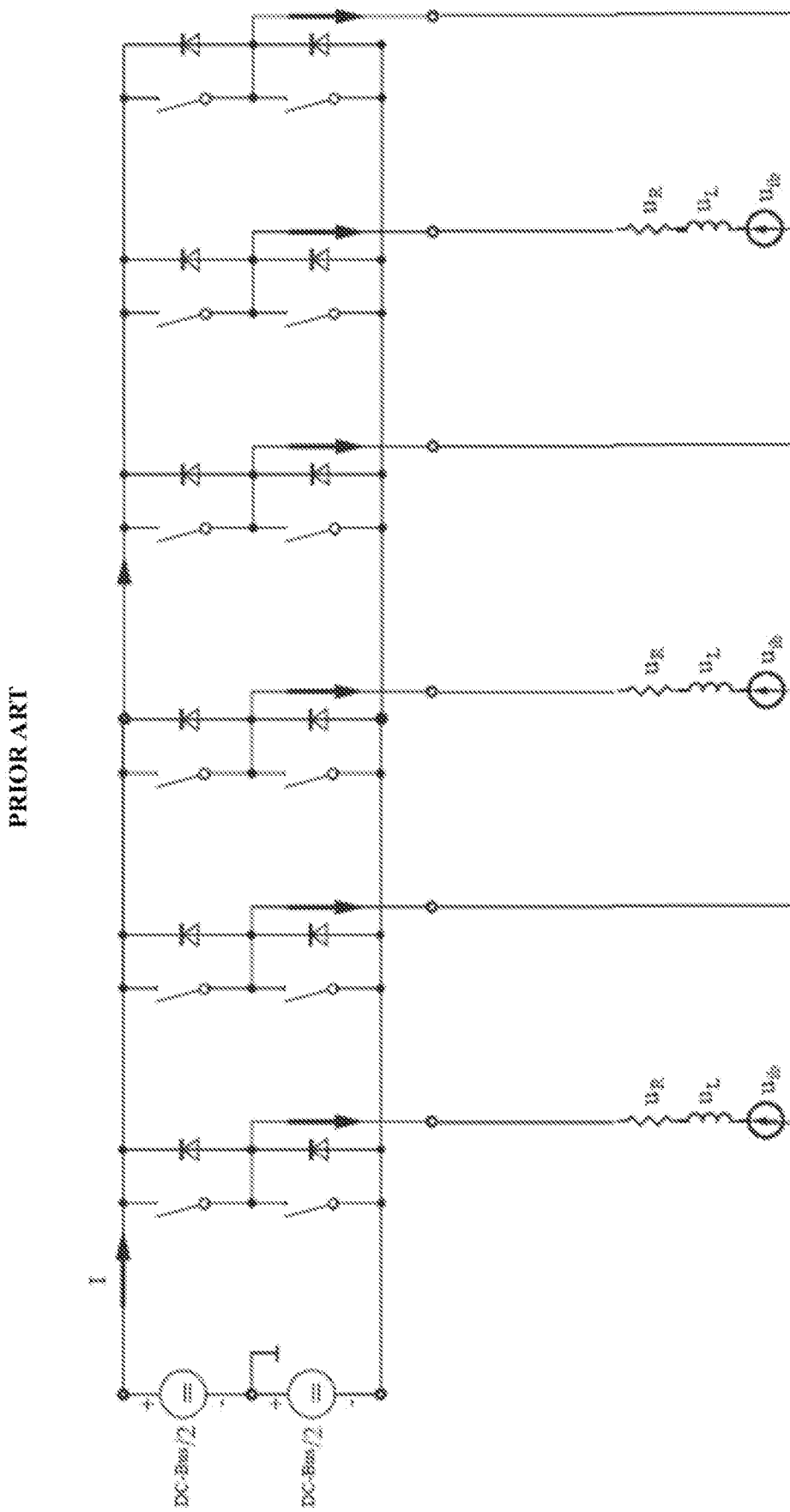
FIG. 3 is a block schematic diagram of a full-bridge inverter circuit for the known FOC system of FIG. 2.

FIG. 3 comprises a schematic diagram from the same publication of the three full-bridge inverters used to drive the three-phase separated windings. After the inverse-Clark transform (FIG. 2), the sinusoidal three phase voltages are mapped into switching on times for each of the three full-bridge inverters to give the positive and negative voltages to drive the separated motor windings.

Figure 4:
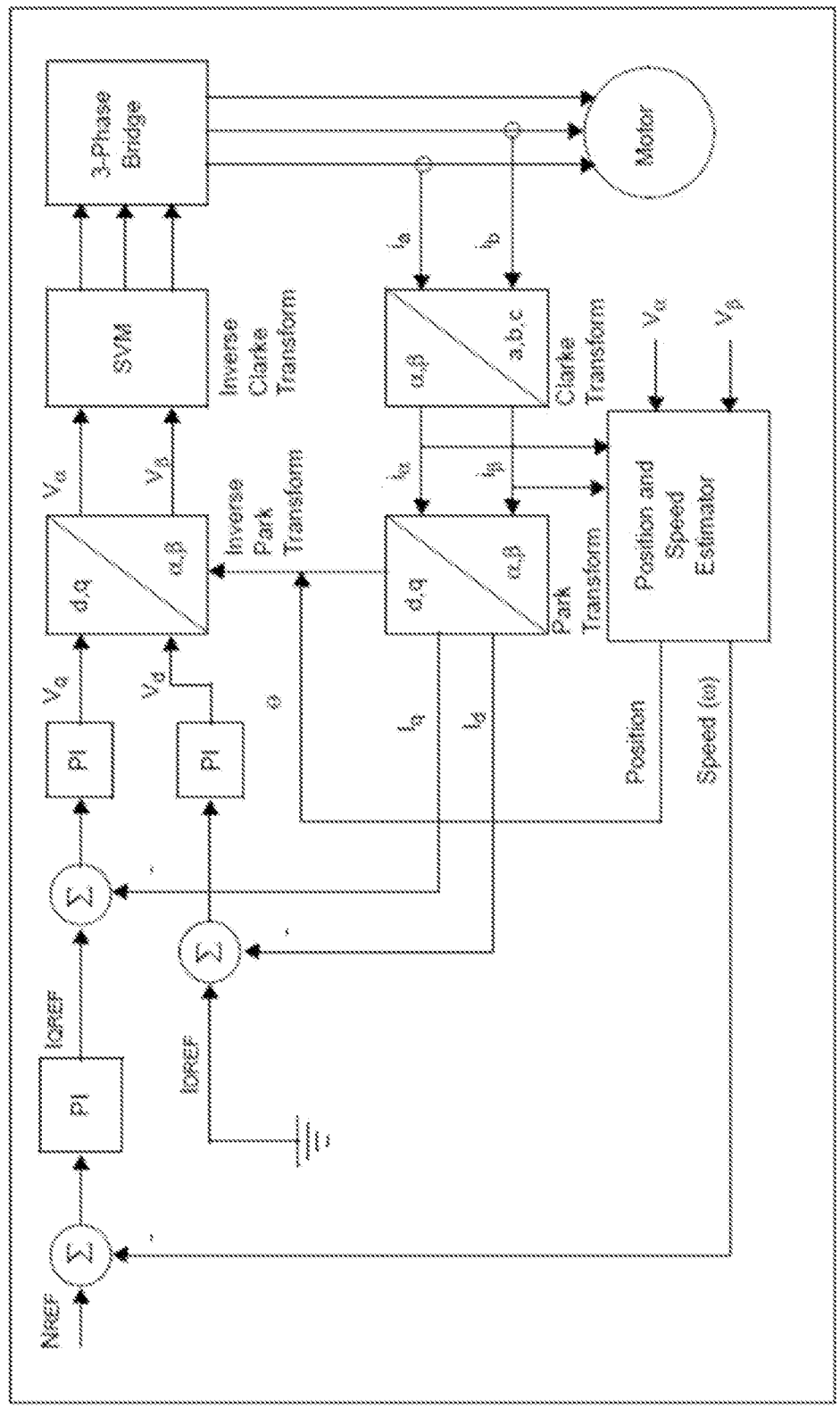
FIG. 4 is a detailed schematic block diagram of the known FOC system of FIG. 2.

FIG. 4 comprises a known vector control block diagram comprising a controller suitable for controlling the three-phase separated winding motor associated with FIGS. 2 and 3. This vector control block diagram is described in the publication entitled "Sensorless Field Oriented Control of PMSM Motors" authored by Jorge Zambada, published by Microchip Technology Inc. in 2007 as paper AN1078, the content of which is also incorporated herein by way of reference.

Vector control of a synchronous motor can be summarized as follows:

(i) The 3-phase stator currents are measured. These measurements typically provide values for $i_a$ and $i_b$, $i_c$ is calculated because $i_a$, $i_b$ and is have the following relationship:

$$i_a + i_b + i_c = 0.$$

(ii) The 3-phase currents are converted to a two-axis system. This conversion provides the variables $i_\alpha$ and $i_\beta$ from the measured $i_a$ and $i_b$ and the calculated $i_c$ values. $i_\alpha$ and $i_\beta$ are time-varying quadrature current values as viewed from the perspective of the stator, i.e., a two-dimensional stationary orthogonal reference frame or coordinate system.

(iii) The two-axis coordinate system is rotated to align with the rotor flux using a transformation angle calculated at the last iteration of the control loop. This conversion provides the $I_d$ and $I_q$ variables from $i_\alpha$ and $i_\beta$. $I_d$ and $I_q$ are the quadrature currents transformed to the rotating coordinate system, a two-dimensional rotating orthogonal reference frame or coordinate system. For steady state conditions, $I_d$ and $I_q$ are constant.

(iv) Error signals are formed using $I_d$, $I_q$ and reference values for each.

The $I_d$ reference controls rotor magnetizing flux.
The $I_q$ reference controls the torque output of the motor.
The error signals are input to PI controllers.
The output of the controllers provide $V_d$ and $V_q$, which is a voltage vector that will be sent to the motor.

(v) A new transformation angle is estimated where $v_\alpha$, $v_\beta$, $i_\alpha$ and $i_\beta$ are the inputs. The new angle guides the FOC algorithm as to where to place the next voltage vector.

(vi) The $V_d$ and $V_q$ output values from the PI controllers are rotated back to the stationary reference frame using the new angle. This calculation provides the next quadrature voltage values $v_\alpha$ and $v_\beta$.

(vii) The $v_\alpha$ and $v_\beta$ values are transformed back to 3-phase values $v_a$, $v_b$ and $v_c$. The 3-phase voltage values are used to calculate new PWM duty cycle values that generate the desired voltage vector. The entire process of transforming, PI iteration, transforming back and generating PWM is schematically illustrated in FIG. 4.

Figure 5:
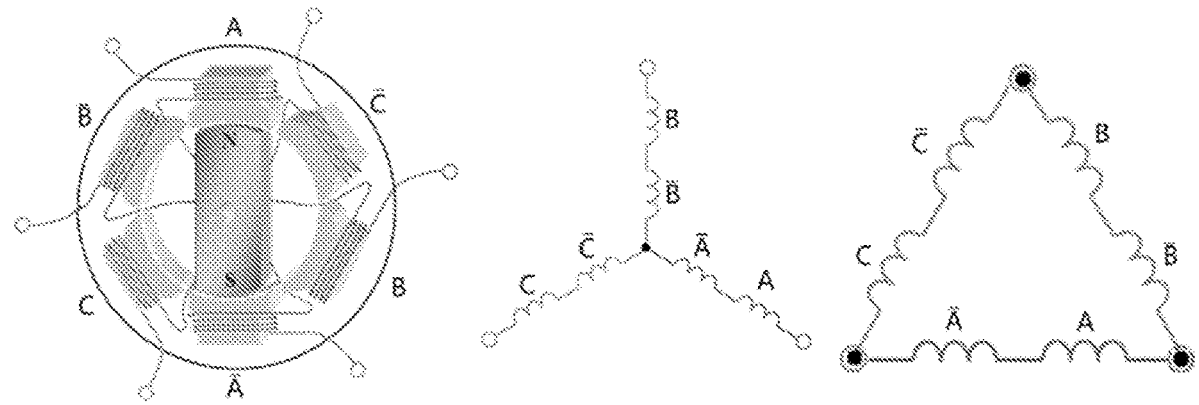
FIG. 5 is a schematic diagram showing the delta and star (or Y) phase coil winding configurations of a three-phase, three-wire permanent magnet rotor motor.

FIG. 5 is a schematic diagram showing the delta and star (or Y) phase coil (stator) winding configurations of an embodiment of a three-phase, three-wire permanent magnet rotor motor of a type controllable by the FOC system of FIG. 1. It will be seen that, for the star configuration of the three phase coil windings, the three phase coil windings share a common central connection point, i.e., the phase coil windings do not each have two free ends and are not each independent of one another. Similarly, for the delta configuration of the three phase coil windings, the adjacent pairs of the three phase coil windings are connected such that the adjacent pairs of windings each share a respective common connection point, i.e., the phase coil windings do not each have two free ends and are not each independent of one another.

Figure 6:
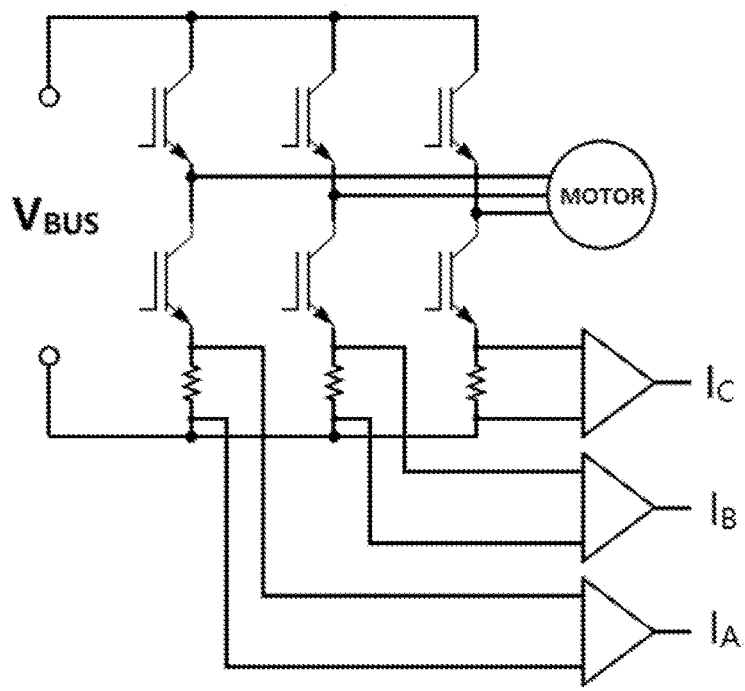
FIG. 6 is a schematic block diagram of a half-bridge inverter circuit for the FOC system for the three-phase, three-wire permanent magnet rotor motor of FIG. 5.

FIG. 6 is a schematic block diagram of the bridge inverter circuit for a closed-loop motor control system for the motor of FIG. 5. It will be seen that the bridge inverters only comprise half-bridge inverters, not full-bridge inverters. Whilst FIG. 6 shows three output currents denoted as "$I_A$", "$I_B$" and "$I_C$" from the half-bridge inverters, only two output currents are required to be fed to the FOC system. This is because the phase coil windings are not independent and thus only two of the outputted currents are necessary to derive the third outputted current. Typically, the sensed currents "$I_A$" ("$i_a$"), "$I_B$" ("$i_b$") are selected.

Figure 7:
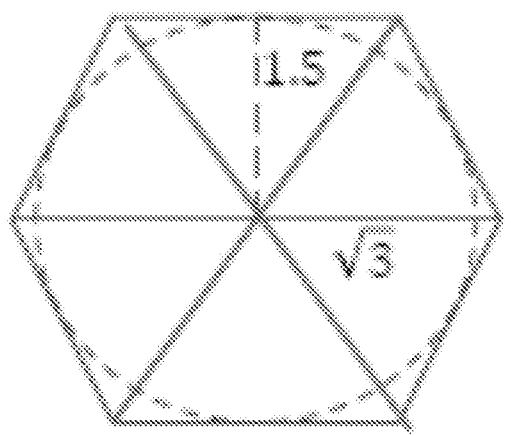
FIG. 7 is a space vector diagram for the three-phase, three-wire permanent magnet rotor motor of FIG. 5.

If the FOC system bus voltage magnitude is considered as having the value "1" for the known FOC system for the motor phase coil winding configuration of FIG. 5 then the three phases voltage vector comprising Va, Vb and Vc can form a space vector within a hexagon as shown in FIG. 7 with a center to corner length of √3 (1.73) and a biggest internal circle of radius 1.5. The maximum motor torque is achieved at the six corners of the hexagon.

For the known FOC system of FIG. 1 for the motor phase coil winding configuration of FIG. 5, the space vector modulation is calculated by:

Step I: The reference voltage in the abc coordinates is converted to the space vector normalized to the DC voltage in the alpha-beta coordinates and the rotation angle in the coordinates of the reference vector is determined;

Step II: The sector in which the reference vector is located is determined and it is determined how long the vectors in the switching states must be applied in order to form the reference voltage; and Step III: Switching is performed according to the order in which the vectors in the switching states are applied.

In one example as described in pages 10-13 of the publication entitled "Sensorless Field Oriented Control (FOC) on XC878", Application Note V1.0, 2009-04 published by Infineon Technologies AG, the content of which is incorporated herein by reference, the SVMs are calculated by:

Calculate $V_{\alpha,\beta}$ and determine the sector of reference vector by the rotation angle.

$$v_\alpha = v_a$$
$$v_\beta = \frac{1}{\sqrt{3}}(v_a + 2v_b)$$

Determine t1 and t2 by the sector in which the reference vector is located and calculate $t_a$, $t_b$, $t_c$ $$t_c = \frac{1 - t_1 - t_2}{2}$$
$$t_b = t_c + t_1$$
$$t_a = t_b + t_2$$

Table 1 below comprises the timing table for performing switching of the half-bridge inverters according to the order in which the vectors in the switching states are applied.

TABLE 1

|  | A | B | C | D | E | F |
| --- | --- | --- | --- | --- | --- | --- |
| t1 | va | vc | vc | vb | vb | va |
| t2 | vb | vb | va | va | vc | vc |
| Svm_a | ta | tb | tc | tc | tb | ta |
| Svm_b | tb | ta | ta | tb | tc | tc |
| Svm_c | tc | tc | tb | ta | ta | tb |

Figure 8:
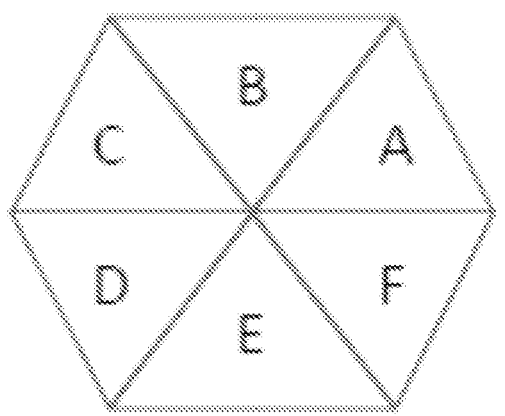
FIG. 8 is the space vector diagram of FIG. 7 identifying the sectors.
Figure 9:
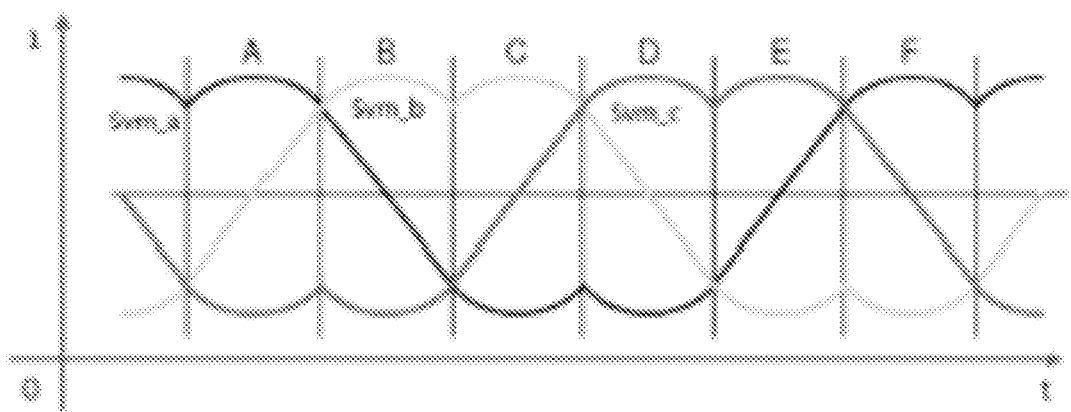
FIG. 9 shows the SVM control waveforms for the three-phase, three-wire permanent magnet rotor motor of FIG. 5.

FIG. 8 shows the reference vector sectors in the hexagon for this example. FIG. 9 shows the SVM control waveforms for this example.

Figure 10:
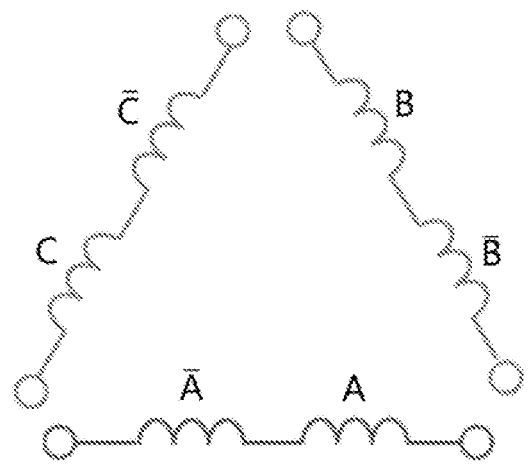
FIG. 10 is a schematic diagram showing a six-wire configuration of phase coil windings of a three-phase separated windings motor in which the closed-loop operating method in accordance with the invention can be implemented.
Figure 11:
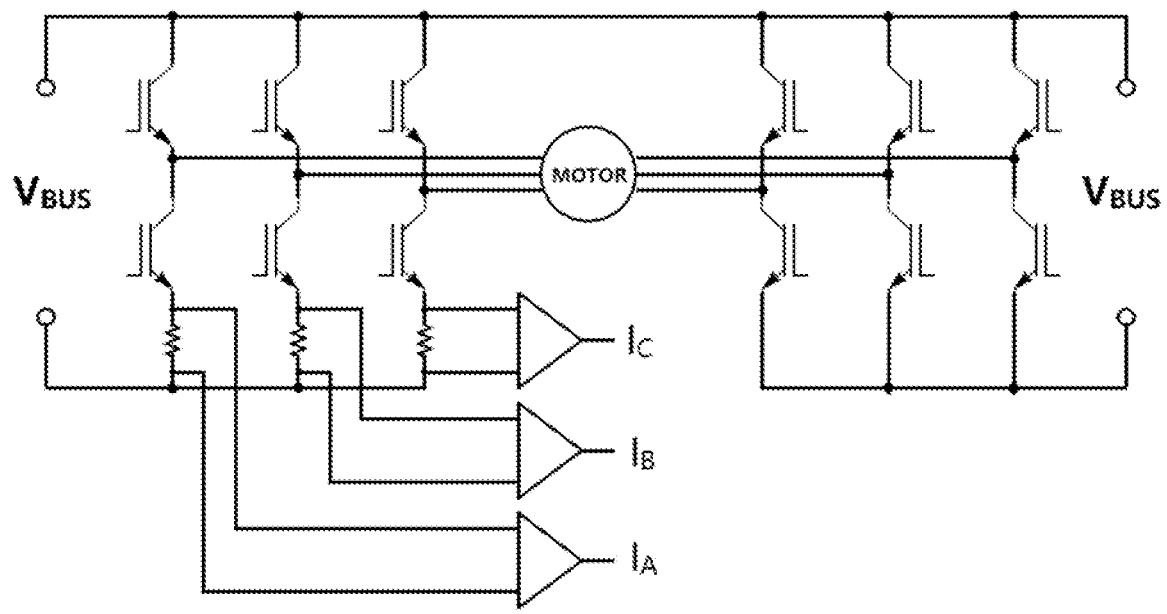
FIG. 11 is a schematic block diagram of a full-bridge inverter circuit for a closed-loop motor control system in accordance with the invention for the three-phase, six-wire separated windings motor of FIG. 10.

In contrast to FIG. 5, FIG. 10 provides a schematic diagram showing a six-wire configuration of the phase coil windings of a multi-phase motor in accordance with the invention whilst FIG. 11 provides a schematic block diagram of a full-bridge inverter circuit for a closed-loop controller for said motor. The six-wire phase coil winding configuration results from the fact that none of the three phase coil windings having any common connection points in contrast to the conventional delta or star stator winding configurations of FIG. 5 which have at least one common connection point between at least two of the phase coil windings.

Figure 12:
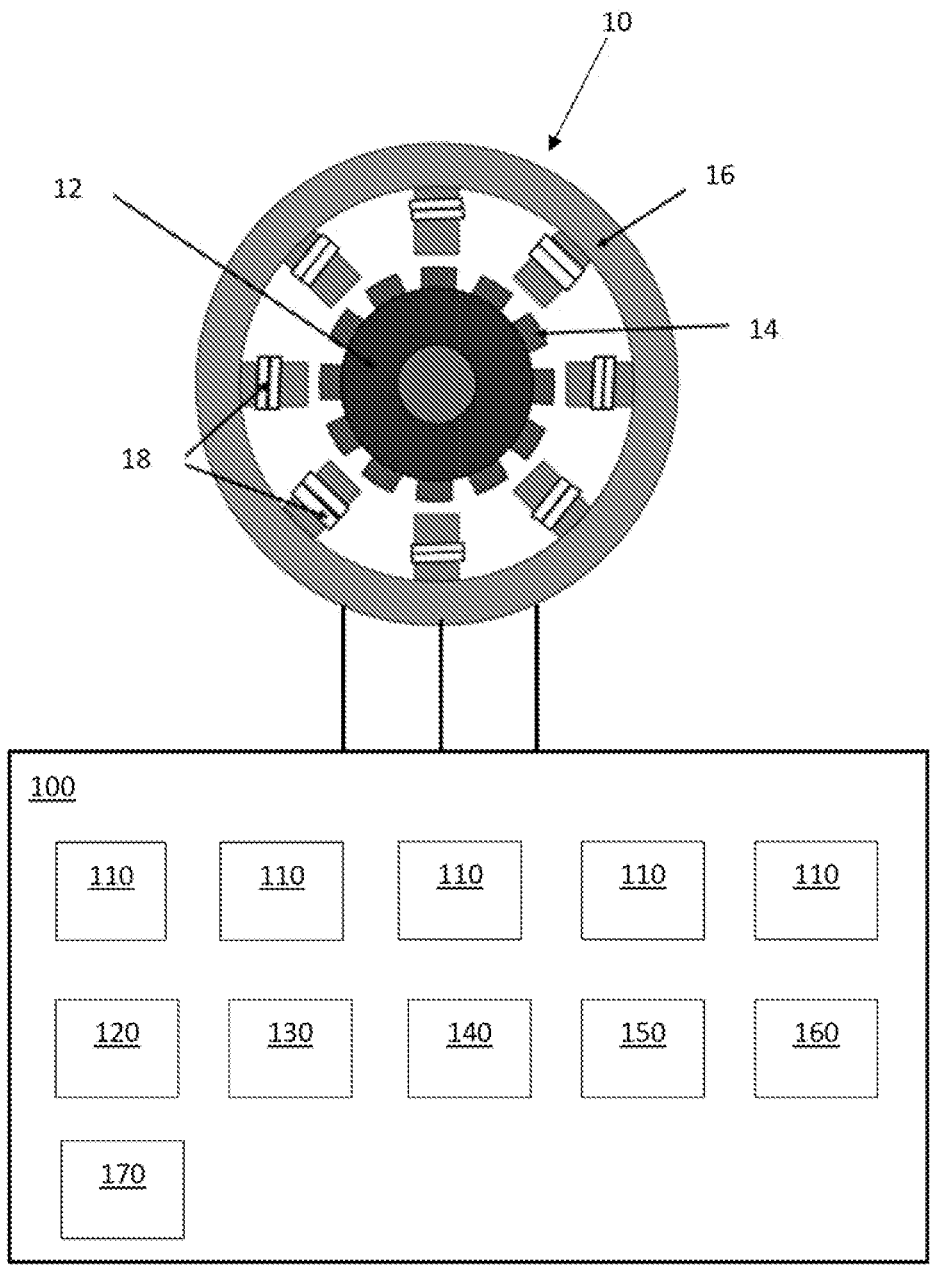
FIG. 12 is a schematic diagram showing the delta and star (or Y) stator windings configurations of a multi-phase separated windings motor in which the closed-loop operating method in accordance with the invention can be implemented.

FIG. 12 shows an exemplary embodiment of an improved closed-loop controller 100 for a multiphase separated windings motor 10 in accordance with concepts of the present invention. The multiphase separated windings motor 10 has a permanent magnet rotor 12 with a plurality of permanent magnets 14 and a stator 16 with a plurality of phase coil (stator) windings 18. Whilst the multiphase separated windings motor 10 is shown with the stator 16 surrounding the rotor 12 in a known manner, it will be understood that the concepts of the present invention are equally applicable to a synchronous motor where the rotor surrounds the stator, i.e., the stator is arranged internally of the rotor.

In the illustrated embodiment, the closed-loop controller 100 may comprise a plurality of functional blocks 110 for performing various functions thereof. For example, the closed-loop controller 100 may comprise a suitably modified or suitably configured known vector-based closed-loop controller such as a direct torque control (DTC) closed-loop controller or a Field Oriented Control (FOC) closed-loop controller as described, for example, in "Sensorless Field Oriented Control of PMSM Motors" of paper AN1078 and as illustrated in FIG. 13 herein but modified as described below in accordance with the concepts of the invention.

The closed-loop controller 100 may, for example, be implemented using logic circuits and/or executable code/machine readable instructions stored in a memory for execution by a processor 120 to thereby perform functions as described herein. For example, the executable code/machine readable instructions may be stored in one or more memories 130 (e.g., random access memory (RAM), read only memory (ROM), flash memory, magnetic memory, optical memory, or the like) suitable for storing one or more instruction sets (e.g., application software, firmware, operating system, applets, and/or the like), data (e.g., configuration parameters, operating parameters and/or thresholds, collected data, processed data, and/or the like), etc. The one or more memories 130 may comprise processor-readable memories for use with respect to one or more processors 120 operable to execute code segments of the closed-loop controller 100 and/or utilize data provided thereby to perform functions of the closed-loop controller 100 as described herein. Additionally, or alternatively, the closed-loop controller 100 may comprise one or more special purpose processors (e.g., application specific integrated circuit (ASIC), field programmable gate array (FPGA), graphics processing unit (GPU), and/or the like configured to perform functions of the closed-loop controller 100 as described herein.

Figure 13:
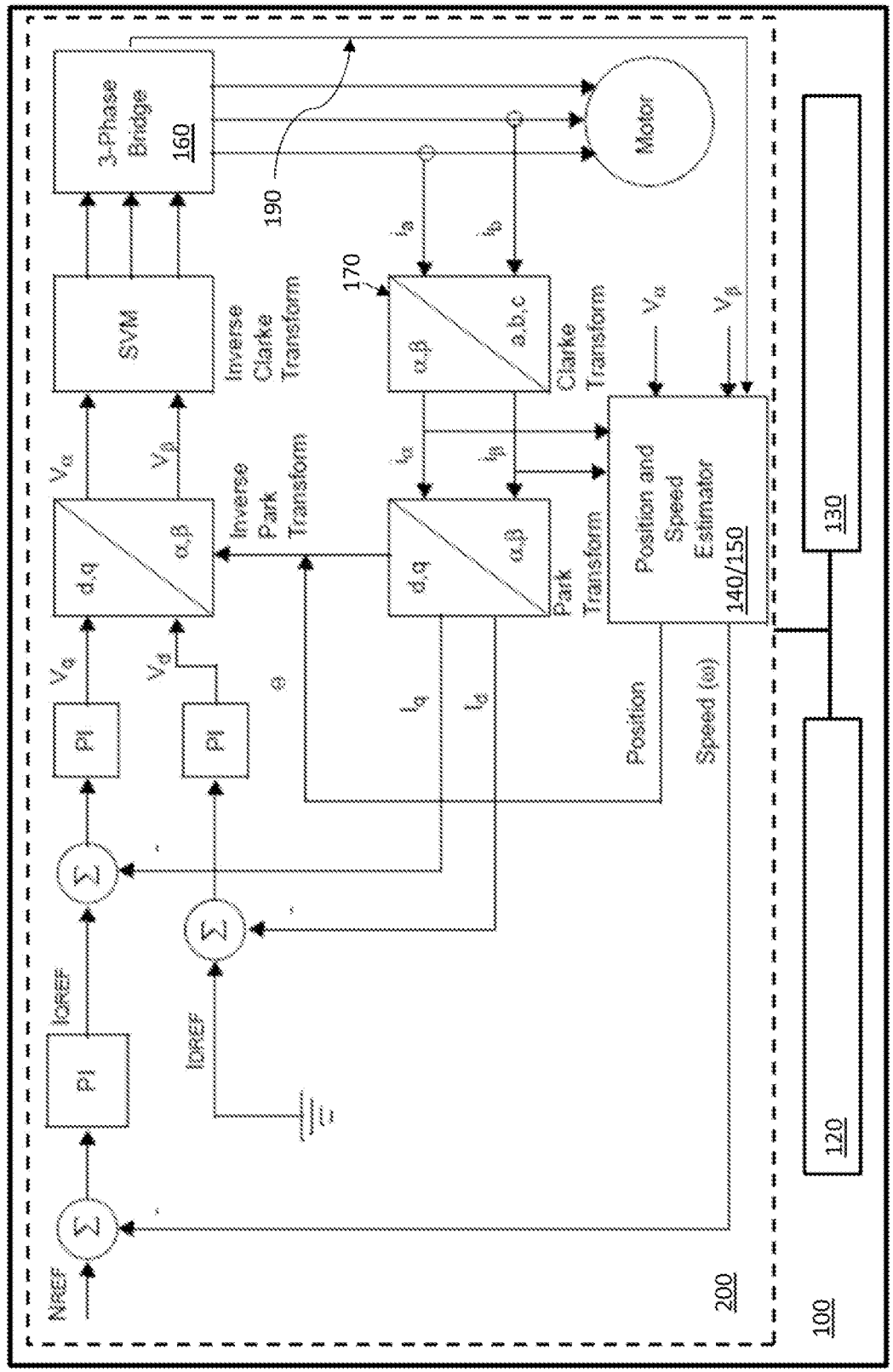
FIG. 13 detailed schematic block diagram of a closed-loop motor control system in accordance with the invention.

In a broad aspect, the invention comprises using the closed-loop controller 100 of FIGS. 12 and 13, e.g., using the modified FOC controller 200 of FIG. 13, to implement the closed-loop operating procedure in accordance with the invention. The closed-loop controller 100 may comprise any known, suitable closed-loop controller for synchronous operation and may comprise the FOC controller 200 as described in "Sensorless Field Oriented Control of PMSM Motors" of paper AN1078 or as described in the publication entitled "Sensorless PMSM Field-Oriented Control", the FOC controller 200 being suitably modified or reconfigured to implement the closed-loop operating method of the invention. Two or more of the outputs of the 3-phase bridge module 160 of the closed-loop controller 100/200 of FIG. 13 comprising two or more of the sensed currents denoted as "$I_A$", "$I_B$" and "$I_C$" in FIG. 11 are fed to the Clarke Transform module 170 of the closed-loop controller 100/200 for processing.

The modified or reconfigured closed-loop controller 100/200 of FIGS. 12 and 13 is arranged to operate the synchronous motor 10 having a permanent magnet rotor 12 and stator windings 18 by energizing the stator windings 18 using pulse width modulated (PWM) motor control signals.

Figure 14:
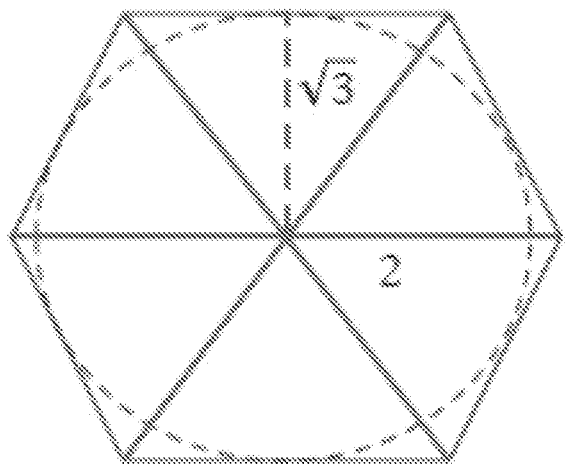
FIG. 14 is a space vector diagram for the three-phase, six-wire separated windings motor of FIG. 10.

Taking the six-wire, three phase motor winding configuration of FIG. 10 controlled by the modified FOC controller 200 of FIG. 13, it will be seen that, if the modified FOC system bus voltage magnitude is considered as having the value "1", then the three phases voltage vector comprising Va, Vb and Vc forms a space vector within a hexagon as shown in FIG. 14 with a center to corner length of 2 and a biggest internal circle of radius $\sqrt{3}$ (1.73). The maximum motor torque is achieved at the six corners of the hexagon, but the maximum constant torque at all rotor angles is achieved by the biggest internal circle inside the hexagon. Comparing the hexagon of FIG. 14 with the hexagon of FIG. 7 indicates that closed loop control of a three-phase motor having the separated winding configuration of FIG. 10 can provide 15% more constant torque over the known motor winding configuration of FIG. 5.

For the three-phase, 6-wire motor configuration of FIG. 10, it is possible to obtain maximum constant torque by applying a voltage control space vector waveform derived from a full-bridge SVM (Fbsvm) calculated from SVM by:

$$\text{Fbsvm}(t) = 2SVM(t) - 1.$$

Figure 15:
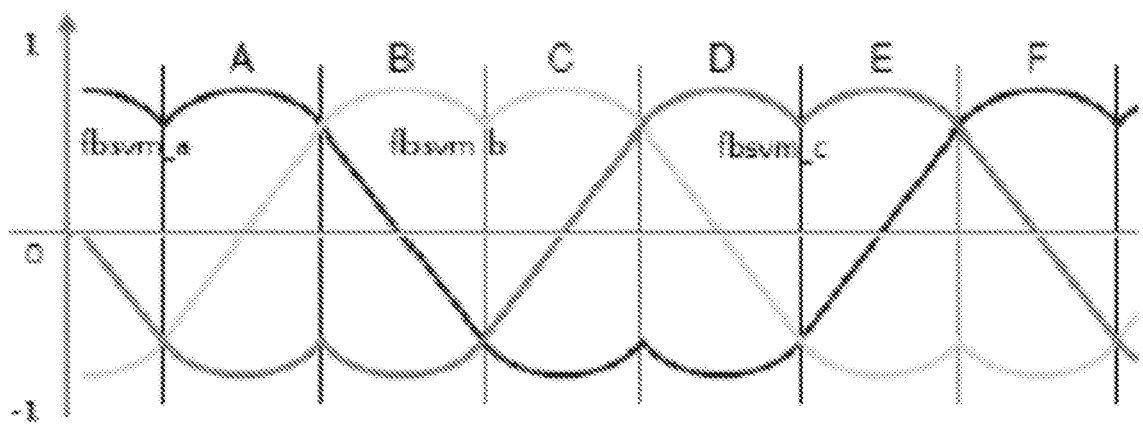
FIG. 15 shows the Fbsvm control waveforms for the three-phase, six-wire separated windings motor of FIG. 10 when operating in the second range.

As can be seen from FIG. 9, the SVM waveform for a known three-phase, three-wire motor winding configuration ranges between zero and 1 with respect to the magnitude of the controller bus voltage. In contrast, as shown in FIG. 15, the SVM waveform for the three-phase, six-wire motor winding configuration of FIG. 10 ranges between −1 and 1 with respect to the magnitude of the controller bus voltage.

Figure 16:
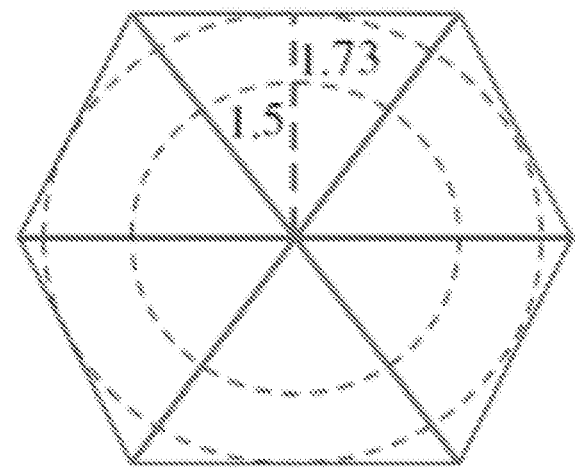
FIG. 16 is a modified space vector diagram for the three-phase, six-wire separated windings motor of FIG. 10.
Figure 17:
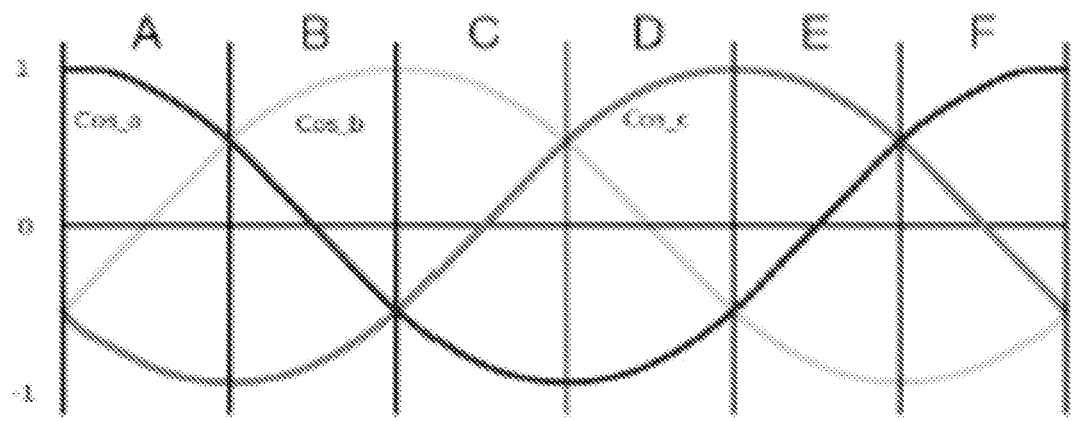
FIG. 17 shows the sinewave control waveforms for the three-phase, six-wire separated windings motor of FIG. 10 when operating in the first range.

However, referring to FIG. 16 which provides a modified space vector hexagon for the three-phase, six-wire motor winding configuration of FIG. 10, it has been recognized that, as Fbsvm is only good for providing extra torque in the range above 1.5, it is possible to apply sine waveform control signals to a first range starting at zero and reaching 1.5 and apply Fbsvm to only a second range above 1.5 up to the maximum 1.73 in this example. For other multi-phase separated winding configurations, different first and second range values may apply. Consequently, the sine waveform signals of FIG. 17 are applied to the first range and the Fbsvm waveform signals of FIG. 15 are applied to the second range to control the pulse modulated signals to the separated phase coil windings during motor operation.

For the control of the motor in the second range, the method can be implemented by taking Table 1 above and applying the equation "Fbsvm(t)=2SVM(t)−1" to the table entries.

The invention therefore provides in one aspect, a multiphase permanent magnet rotor motor comprising: a plurality of phase coil windings, each phase coil winding having two free ends, the plurality of phase coil windings being without a common node; and a controller comprising a plurality of full-bridge inverters, wherein each full-bridge inverter has two output ends electrically connected to the two free ends of a corresponding phase coil winding, the controller being configured to operate the plurality of full-bridge inverters to output pulse modulated control signals to their respective phase coil windings; wherein the controller is configured to output pulse modulated control signals to the respective phase coil windings as sine waves in a first range from zero of the magnitude of the controller bus voltage to a predetermined, selected, or calculated end value for said first range, and to output pulse modulated control signals to the respective phase coil windings as full-bridge space vector modulation signals (Fbsvm) in a second range commencing at the predetermined, selected, or calculated end value for said first range and ending at a predetermined, selected, or calculated end value for said second range.

Preferably, the predetermined, selected, or calculated end value for said second range comprises a radius of a biggest internal circle inside a corresponding space vector diagram.

Preferably also, the controller is a digital controller which preferably comprises a full-bridge space vector modulation controller.

The plurality of phase coil windings may be arranged in parallel without a common connection point.

The invention also provides a closed loop method of driving the multi-phase permanent magnet rotor motor, the method comprising the step of: outputting pulse modulated control signals to the respective phase coil windings as sine waves in a first range from zero of the magnitude of the controller bus voltage to a predetermined, selected, or calculated end value for said first range, and to output pulse modulated control signals to the respective phase coil windings as full-bridge space vector modulation signals (Fbsvm) in a second range commencing at the predetermined, selected, or calculated end value for said first range and ending at a predetermined, selected, or calculated end value for said second range.

Figure 18:
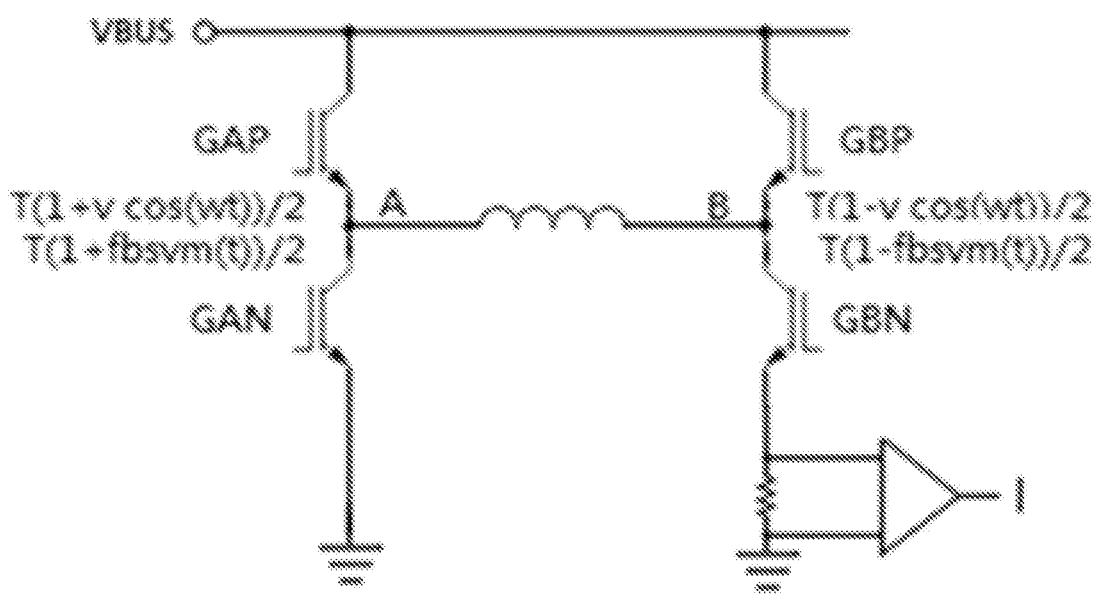
FIG. 18 is a block schematic diagram of a modified full-bridge inverter for the closed-loop motor control system in accordance with the invention.

FIG. 18 comprises a schematic diagram of one of the full-bridge circuits for the modified closed-loop motor controller 100/200 for the three-phase separated windings motor in accordance with the invention. The full-bridge comprises first and second half-bridges denoted as "A" and "B" respectively. For the first range from zero to 1.5 of the space vector diagram of FIG. 16, the sine waveforms of Table 2 below are applied to the half-bridges 1, B.

TABLE 2

| Half Bridge | Sine Waveform |
|---|---|
| A | T(1 + v cos(wt))/2 |
| B | T(1 − v cos(wt))/2 |
| A − B | T v cos(wt) | where T is the PWM sampling period, v is the normalized voltage in the range of 0 to 1, w is the angular velocity and t is the time for the sampling period. This provides better efficiency compared with a pure SVM method as the SVM method has high total harmonic distortion (THD).

In the range of 1.5 to 1.73 of the space vector diagram of FIG. 16, Fbsvm waveforms as shown in Table 3 are applied to the half-bridges A and B respectively.

TABLE 3

| Half Bridge | Sine Waveform |
|---|---|
| A | T(1 + fbsvm(t))/2 |
| B | T(1 − fbsvm(t))/2 |
| A − B | T fbsvm(t) |

This provides extra torque compared with the known three-phase, three-wire motor phase coil winding configuration.

Figure 19:
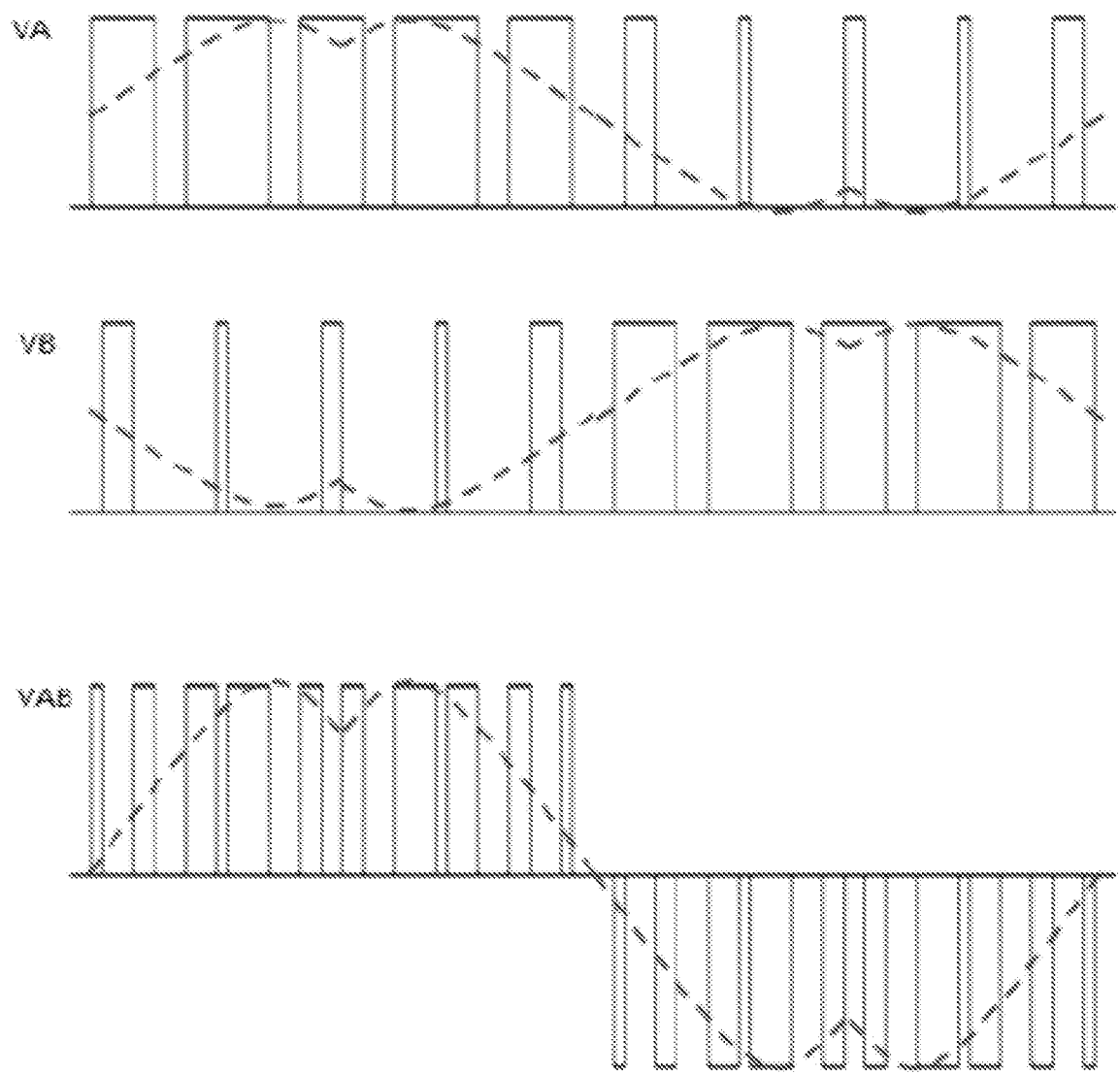
FIG. 19 shows the Fbsvm PWM control waveforms for the three-phase, six-wire separated windings motor of FIG. 10 when operating in the second range.

The Fbsvm PWM waveforms applied during the second range are shown in FIG. 19.

In the modified closed-loop motor controller 100/200 of the invention, one half-bridge only of each full-bridge is provided with a current sensing circuit 180. As shown in FIG. 13, preferably each such current sensing circuit is connected, as denoted by line 190, to the position and speed estimation module 140/150 whereby the sensed current signals can be employed to improve or correct the rotor position estimations during normal motor operation.

In providing a current sensing circuit 180 in only one half-bridge of each full-bridge circuit means that current sensing is only detected in one of the four states as shown in Table 4:

TABLE 4

| State | GAP | GAN | GBP | GBN | A | B | $V_{AB}$ | Remark |
|---|---|---|---|---|---|---|---|---|
| 1 | high | low | low | high | high | low | positive | |
| 2 | high | low | high | low | high | high | zero | |
| 3 | low | high | high | low | low | high | negative | |
| 4 | low | high | low | high | low | low | zero | Current Sensing |

It has been found, however, that sensing current in only one of the four states is sufficient to provide a modified means of enhancing or correcting rotor position estimates.

The invention therefore provides a multi-phase permanent magnet rotor motor comprising: a plurality of phase coil windings, each phase coil winding having two free ends, the plurality of phase coil windings being without a common node; and a controller comprising a plurality of full-bridge inverters, wherein each full-bridge inverter has two output ends electrically connected to the two free ends of a corresponding phase coil winding, the controller being configured to operate the plurality of full-bridge inverters to output pulse modulated control signals to their respective phase coil windings; wherein each full-bridge inverter has a current sense circuit connected to only one half of each said full-bridge inverter.

Preferably, each of the current sense circuits is connected to a same respective half-side of their said full-bridge inverter.

Preferably, the controller is configured to operate the plurality of full-bridge inverters to output pulse modulated control signals having identical frequency and amplitude to their respective phase coil windings.

Preferably, the controller is configured operate the plurality of full-bridge inverters to output pulse modulated control signals such that the pulse modulated control signals of two adjacent phase coil windings have a non-zero phase difference.

The invention also provides a closed loop method of driving the multi-phase permanent magnet rotor moto, the method comprising the steps of: receiving at the rotor position estimation module of the controller a sensed current signal from at least one of the side-halves of said full-bridge inverters; and modifying the estimated rotor position based on said received sensed current signal.

Figure 21:
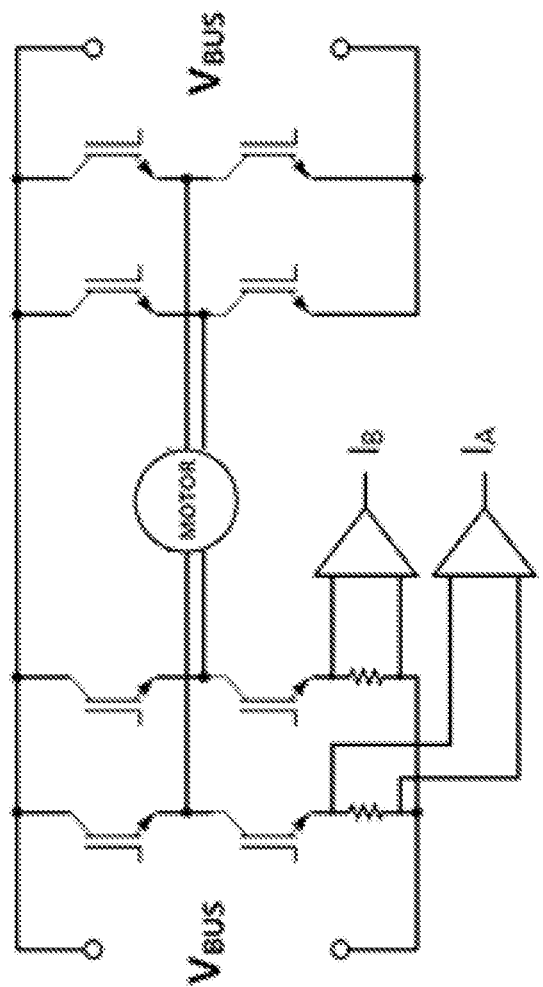
FIG. 21 is a schematic block diagram of a full-bridge inverter circuit for the closed-loop motor control system in accordance with the invention for the multi-phase separated windings motor of FIG. 20.
Figure 20:
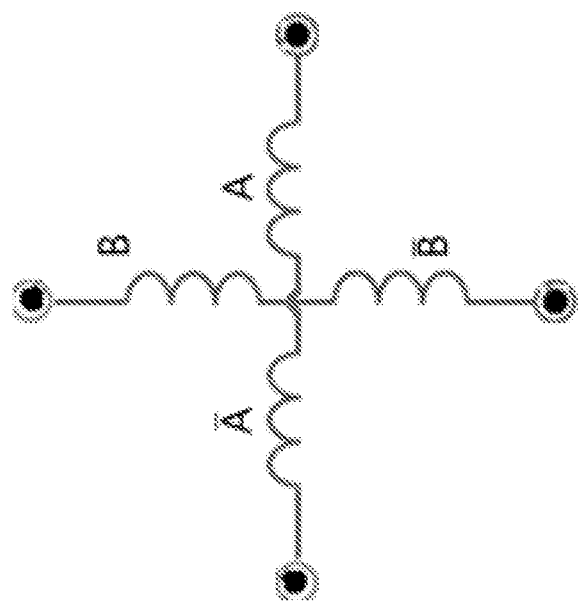
FIG. 20 is a schematic diagram showing a four-wire configuration of phase coil windings of a multi-phase separated windings motor in which the closed-loop operating method in accordance with the invention can be implemented.

FIG. 20 provides a schematic diagram showing a four-wire configuration of 2-phase stator coil windings of the synchronous motor in which the closed-loop operating method in accordance with the invention can be implemented. FIG. 21 provides a schematic block diagram of a full-bridge inverter circuit power stage for the closed-loop motor controller 100/200 in which the sensed currents "$I_A$", "$I_B$" are fed into the Clarke Transform module.

Preferably, the plurality of phase coil windings for embodiments of the invention comprise at least two phase coil windings, or three phase coil windings, or phase coil windings in a number being a multiple of two or three.

The present invention also provides a non-transitory computer-readable medium storing machine-readable instructions, wherein, when the machine-readable instructions are executed by the processor of the closed-loop controller for the synchronous motor, they configure the processor to implement the concepts of the present invention.

The apparatus described above may be implemented at least in part in software. Those skilled in the art will appreciate that the apparatus described above may be implemented at least in part using general purpose computer equipment or using bespoke equipment.

Here, aspects of the methods and apparatuses described herein can be executed on any apparatus comprising the communication system. Program aspects of the technology can be thought of as "products" or "articles of manufacture" typically in the form of executable code and/or associated data that is carried on or embodied in a type of machine-readable medium. "Storage" type media include any or all of the memory of the mobile stations, computers, processors or the like, or associated modules thereof, such as various semiconductor memories, tape drives, disk drives, and the like, which may provide storage at any time for the software programming. All or portions of the software may at times be communicated through the Internet or various other telecommunications networks. Such communications, for example, may enable loading of the software from one computer or processor into another computer or processor. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to tangible non-transitory "storage" media, terms such as computer or machine "readable medium" refer to any medium that participates in providing instructions to a processor for execution.

While the invention has been illustrated and described in detail in the drawings and foregoing description, the same is to be considered as illustrative and not restrictive in character, it being understood that only exemplary embodiments have been shown and described and do not limit the scope of the invention in any manner. It can be appreciated that any of the features described herein may be used with any embodiment. The illustrative embodiments are not exclusive of each other or of other embodiments not recited herein. Accordingly, the invention also provides embodiments that comprise combinations of one or more of the illustrative embodiments described above. Modifications and variations of the invention as herein set forth can be made without departing from the spirit and scope thereof, and, therefore, only such limitations should be imposed as are indicated by the appended claims.

In the claims which follow and in the preceding description of the invention, except where the context requires otherwise due to express language or necessary implication, the word "comprise" or variations such as "comprises" or "comprising" is used in an inclusive sense, i.e., to specify the presence of the stated features but not to preclude the presence or addition of further features in various embodiments of the invention.

It is to be understood that, if any prior art publication is referred to herein, such reference does not constitute an admission that the publication forms a part of the common general knowledge in the art.

The invention claimed is:

1. A multi-phase rotor motor comprising:
   a plurality of phase coil windings, each phase coil winding having two free ends; and
   a controller comprising a plurality of full-bridge inverters, wherein each full-bridge inverter has two output ends electrically connected to the two free ends of a corresponding phase coil winding, the controller being configured to operate the plurality of full-bridge inverters to output pulse modulated control signals to respective phase coil windings;
   wherein the controller is configured to output the pulse modulated control signals to the respective phase coil windings as sine waves in a first range from zero of a magnitude of a controller bus voltage of the controller to a first predetermined end value for the first range, and to output the pulse modulated control signals to the respective phase coil windings as full-bridge space vector modulation (Fbsvm) signals in a second range commencing at the predetermined first end value for the first range and ending at a second predetermined end value for the second range, the second predetermined end value for the second range comprising a radius of a largest internal circle inside a space vector diagram of the multi-phase rotor motor.

2. The multi-phase rotor motor of claim 1, wherein the multi-phase rotor motor is a three phase, 6 wire motor, the first range is from zero to 1.5 times the magnitude of the controller bus voltage and the second range is from 1.5 to 1.73 times the magnitude of the controller bus voltage.

3. The multi-phase rotor motor of claim 1, wherein the Fbsvm signals are determined from half-bridge space vector modulation (SVM) signals according to:

$$Fbsvm = 2Svm - 1.$$

4. The multi-phase rotor motor of claim 1, wherein the phase coil windings are independent windings and the controller is a digital controller.

5. The multi-phase rotor motor of claim 4, wherein the digital controller is a full-bridge space vector modulation controller.

6. The multi-phase rotor motor of claim 1, wherein the plurality of phase coil windings comprise at least one of: two-phase coil windings, three-phase coil windings, or phase coil windings in a number being a multiple of two or three.

7. The multi-phase rotor motor of claim 1, wherein the phase coil windings are arranged in parallel without a common connection point.

8. A three-phase rotor motor comprising:
   three phase coil windings, each phase coil winding having two free ends, the three phase coil windings being without a common node; and
   a controller comprising three full-bridge inverters, wherein each full-bridge inverter has two output ends electrically connected to the two free ends of a corresponding phase coil winding, the controller being configured to operate the three full-bridge inverters to output pulse modulated control signals to their respective phase coil windings;
   wherein the controller is configured to output pulse modulated control signals to the respective phase coil windings as sine waves in a first range from zero of a magnitude of a controller bus voltage to 1.5 times the magnitude of the controller bus voltage, and to output pulse modulated control signals to the respective phase coil windings as full-bridge space vector modulation (Fbsvm) signals in a second range commencing at 1.5 times the magnitude of the controller bus voltage and ending at 1.73 times the magnitude of the controller bus voltage.

9. The three-phase rotor motor of claim 8, wherein the Fbsvm signals are determined from half-bridge space vector modulation (SVM) signals according to:

$Fbsvm = 2Svm - 1$.

10. The three-phase rotor motor of claim 8, wherein the phase coil windings comprise independent windings and the controller is a digital controller.

11. The three-phase rotor motor of claim 10, wherein the digital controller comprises a full-bridge space vector modulation controller.

12. The three-phase rotor motor of claim 8, wherein the three phase coil windings are arranged in parallel without a common connection point.

13. A multi-phase rotor motor comprising:
a plurality of phase coil windings; and
a controller comprising a plurality of full-bridge inverters, wherein each full-bridge inverter has two output ends electrically connected to two free ends of a corresponding phase coil winding, the controller being configured to operate the plurality of full-bridge inverters to output full-bridge space vector modulation (Fbsvm) signals to respective phase coil windings;
wherein each full-bridge inverter has a current sense circuit connected to only one half of the full-bridge inverter; and
wherein the Fbsvm signals are determined from half-bridge space vector modulation (SVM) signals according to: $Fbsvm = 2Svm - 1$.

14. The multi-phase rotor motor of claim 13, wherein each of the current sense circuits is connected to a rotor position estimation module of the controller.

15. The multi-phase rotor motor of claim 13, wherein each of the current sense circuits is connected to a same half-side of the respective full-bridge inverter.

16. The multi-phase rotor motor of claim 13, wherein the phase coil windings comprise independent windings and the controller is a digital controller.

17. The multi-phase rotor motor of claim 16, wherein the digital controller is a full-bridge space vector modulation controller.

18. The multi-phase rotor motor of claim 13, wherein the plurality of phase coil windings comprise at least one of: two-phase coil windings, three-phase coil windings, or phase coil windings in a number being a multiple of two or three.

19. The multi-phase rotor motor of claim 13, wherein the phase coil windings are arranged in parallel without a common connection point.

* * * * *